United States Patent [19]

Smith

[11] Patent Number: 5,664,084

[45] Date of Patent: Sep. 2, 1997

[54] METHOD AND APPARATUS FOR VISUALLY CORRELATING TEMPORAL RELATIONSHIPS

[75] Inventor: Robert Neal Smith, Mesa, Ariz.

[73] Assignee: Motorola, Inc., Schaumburg, Ill.

[21] Appl. No.: 443,531

[22] Filed: May 18, 1995

[51] Int. Cl.⁶ .................................................. G06F 15/00
[52] U.S. Cl. .................................................. 345/440
[58] Field of Search .................... 395/140, 141, 395/142, 155, 161, 113, 120, 134, 135, 157

[56] References Cited

U.S. PATENT DOCUMENTS

| 4,868,687 | 9/1989 | Penn et al. | 360/13 |
| 5,247,610 | 9/1993 | Oshima et al. | 395/135 |

OTHER PUBLICATIONS

An article entitled "Advanced Numerical Modeling of Microwave Penetration and Coupling for Complex Structures" by Dr. Allen Taflove et al., Reproduced by NTIS, U.S. Department of Commerce, Prepared for: Lawrence Livermore National Laboratory, Electronics Engineering Department, Quarterly Report No. 2, Jun.–Aug. 1985.

An article entitled "Visualizing Operations on Temporal Data" by Steve B. Cousins, et al., IEEE, 1990, pp. 72–76.

Primary Examiner—Phu K. Nguyen
Attorney, Agent, or Firm—Frank J. Bogacz

[57] ABSTRACT

A display system (10) collects data generated by a plurality of sensors (12) and performs an image process (24) to graphically present the sensor data on a display (16). The sensor data may be characterized by gap periods (52) during which the data are unavailable. A compress process (30) evaluates raw sensor data (26) and forms a compressed table (32) from which time-lines (56) for each sensor (12) may be drawn. A draw process (34) and a decompress process (36) draw collinear line segments (54) separated by gaps (52) for selected sensors (12). A time-line window (64) may be overlaid on the graphic image data.

25 Claims, 7 Drawing Sheets

1

METHOD AND APPARATUS FOR VISUALLY CORRELATING TEMPORAL RELATIONSHIPS

TECHNICAL FIELD OF THE INVENTION

The present invention relates generally to the field of information management. More specifically, the present invention relates to a method and apparatus for controlling a display screen to aid visualization of complex, time valued information.

BACKGROUND OF THE INVENTION

Numerous devices collect, process, and/or present information to a human user. When the user needs to comprehend only a small amount of information, simple textual and numeric displays may be adequate. However, when a large amount of information is to be presented to the user, when the information may include more complex relationships that the user needs to comprehend, and when the user needs to fully grasp the presented information and its relationships quickly, then displays which present only text and numbers are inadequate. In these situations graphic displays are desirable because graphics typically enhance a user's ability to quickly appreciate the nature of the information being presented. The use of radar display terminals, oscilloscopes and spectrum analyzers are a few examples of situations which depict information graphically.

Current practical displays are limited to the use of only two dimensions for displaying graphic information. Consequently, information characterized by two independent variables is easily accommodated, and even information characterized by three independent variables may be accommodated through the use of projection views determined by trigonometric calculations. However, problems arise when more than three independent variables are required to present information to a user, and the conveyance of information typically suffers.

Unfortunately, certain information presentation situations require the graphic depiction of variations in four or five independent variables. These situations occur, for example, when two independent parameters, such as latitude and longitude, amplitude and frequency, or the like, vary in time and in accordance with another parameter. The other parameter may, for example, describe a particular one of several different sensors or other measuring devices that are used to collect signals describing the two independent parameters.

The information presentation problem becomes more complex when signal or data quality is to be depicted as well. The depiction of signal or data quality is useful to distinguish between an absence of valid data and the presence of valid data which indicate an absence of signal. For example, a user to whom information is being presented may notice that a previously visible graphic object is no longer being displayed. The graphic object's disappearance may be attributed to an absence of the real world phenomenon being measured or to an absence of signals characterizing the real world phenomenon.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Current technology displays frames of sensor data in two modes. One mode called time compression and the other called time integration. In the compression mode sensor data is displayed one frame at a time. This mode can be operated in a single frame submode or in a repeating run submode. The compression mode frames of sensor data can be re-displayed on the display window to enable the user to detect features of the sensor data that helps to identify the object data and to correlate the event object data with surrounding event object data.

The integration mode single frames of sensor data remain on the display until the oldest to the newest frame of object data has been presented. At the time when all frames of event object data have been presented in an order from oldest frame to newest frame, a pause in the frame display process is executed and then the display is cleared and the process of re-displaying the frames of event object data is repeated.

Figure 1:
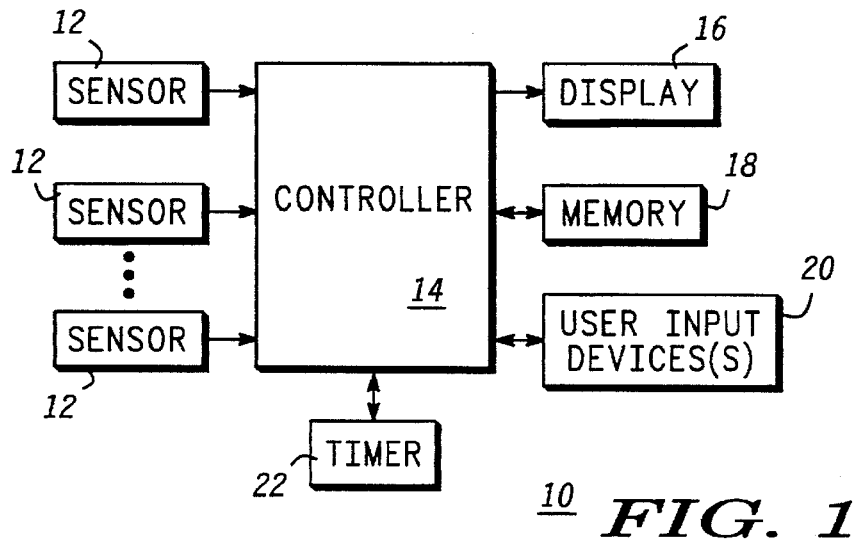
FIG. 1 shows a block diagram of hardware included in a computer controlled system for visually correlating temporal relationships in data.

FIG. 1 shows a block diagram of hardware included in a computer controlled system 10 for visually correlating temporal relationships in data. System 10 includes a plurality of sensors 12. Each sensor 12 provides signals and/or a data set that characterizes a real world phenomenon.

Sensors 12 may provide multi-dimensional data. Multi-dimensional data are data which characterize more than one independent variable. One example of multi-dimensional data characterizes location in accordance with an X–Y coordinate system, such as latitude and longitude. One independent variable conveys an X coordinate and another conveys a Y coordinate.

Nothing requires a common type of data or signal to be provided by sensors 12. Moreover, sensors 12 may provide their signals or data discontinuously and asynchronously relative to one another. In other words, sensors 12 need not provide a continuous signal stream, and the stream may be characterized by periods for which valid sensor data are unavailable.

Information which has a location component and which can be shown on a map represents one type of the data or signals that sensors 12 may provide. Different types of sensors, such as radar, acoustic listening devices, two-way or other radio communications, personal observations, telephones, cameras, and the like may generate signals which are concerned with a physical object or event having a particular location. In order to coordinate the physical objects or events, a map upon which the physical objects or events are displayed as graphic objects is an effective way to convey information concerning the physical objects and events. Such maps are useful in connection with weather reporting and forecasting, city police and emergency service coordination, military command and control, and other endeavors.

While sensors 12 may provide signals having a location component, the present invention is not limited to these types of sensors. Other examples of sensors 12 may measure signal amplitude and frequency, X–Y pictorial images, and the like.

Sensors 12 couple to a controller 14. Controller 14 couples to a display 16, memory 18, a user input device or devices 20, and a timer 22. Controller 14 may be provided by a microprocessor, microprocessor array, or other programmable device. Display 16 may be provided by a conventional video display terminal which displays color graphic images. Memory 18 may provide optical, magnetic, and/or semiconductor storage for data which are generated by system 10 and for data which provide software programming instructions for controller 14. User input device 20 represents any conventional data input device, whether key-activated or configured as a pointing device, such as a mouse or trackball. System 10 uses timer 22 to keep track of the current time so that time stamps may be associated with data or signals provided by sensors 12. Sensors can put their own time stamp on the data, but for other sensors time of incoming data events are marked with local time.

Figure 2:
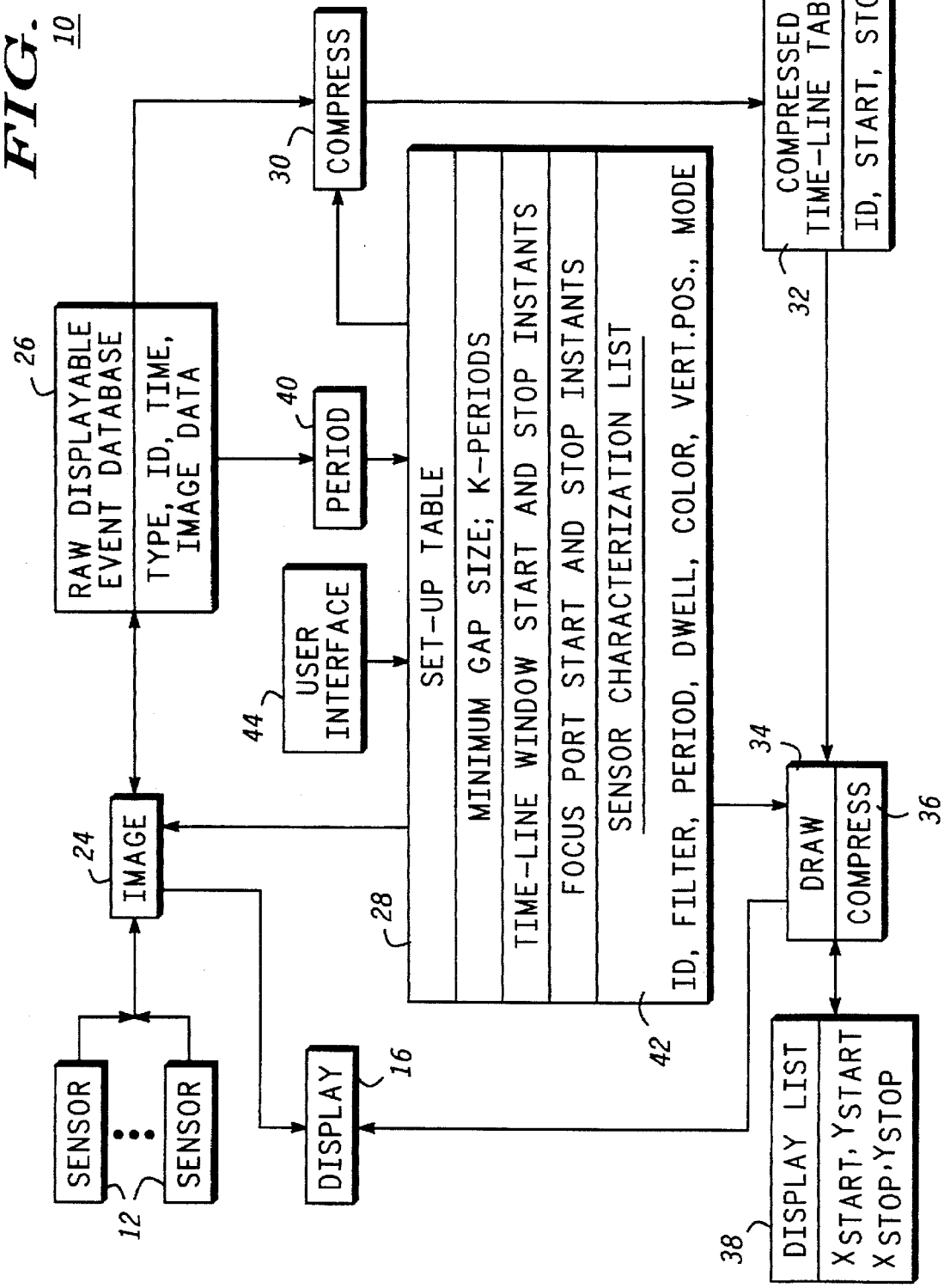
FIG. 2 shows a data flow diagram for the system of FIG. 1.

FIG. 2 shows a data flow diagram for system 10. FIG. 2 shows that sensors 12 provide data to an image process 24. Image process 24 and other processes discussed below are defined by computer software programming stored in memory 18 and executed by controller 14 (see FIG. 1). Such programming may operate in conjunction with conventional operating systems and computing environments, such as Windows.

Figure 3:
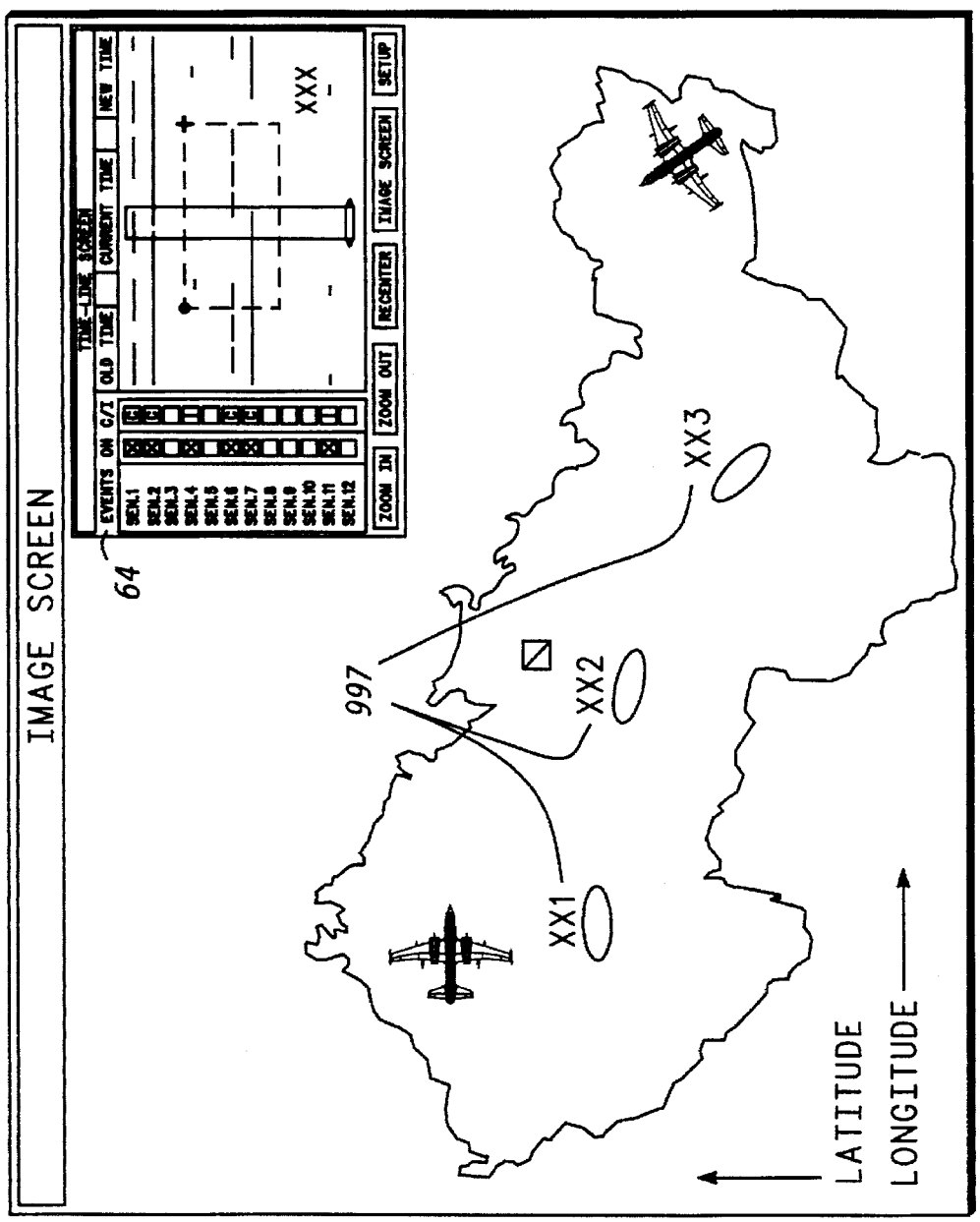
FIG. 3 shows a schematic view of an exemplary image screen generated by the system of FIG. 1.

In the preferred embodiments of the present invention, image process 24 is a conventional process which translates data obtained from sensors 12 into displayable image data, stores the image data in a raw displayable event database 26, and uses the image data to construct a window having a graphic depiction of the sensor data for display 16. FIG. 3 shows a schematic view of an exemplary image screen generated in part by process 24. Those skilled in the art will appreciate that FIG. 3 depicts only an example of a single type of image that may be generated. The present invention is not limited to image screens that resemble FIG. 3.

Referring to FIGS. 2 and 3, image process 24 associates time stamps with the sensor data, and these time stamps are stored with the sensor data in database 26. Desirably, process 24 converts the sensor data into icons or other graphic objects, combines the icons with background imaging, such as a map, positions and orients the icons as desired relative to the background imaging, and possibly associates the icons with displayable text. Such imaging processes are well known in radar and other fields.

In addition, image process 24 may import data from a set-up table 28 to control the presentation of images. Such data may assign color attributes to image objects, identify specific image objects to include or exclude from display, and specify a display mode. For example, set-up table 28 may provide data which define a time period from which images are to be displayed. Display mode data may specify whether to operate in an integrated mode where images throughout the specified time period are laid on top of one another or in a compressed mode where only images valid at a particular instant are to be displayed.

Referring to FIG. 2, a compress process 30 processes the events stored in database 26 in accordance with parameters provided from set-up table 28. Generally, compress process 30 picks a specific, small amount of data from database 26 and places these data in a compressed time-line table 32. A draw process 34 and a decompress process 36 then quickly analyze the data included in compressed time-line table 32 in accordance with parameters from set-up table 28. Processes 34 and 36 together form a display list 38 of objects, and in particular line segments, which are drawn in a time-line window that is presented at display 16 and shown in FIG. 4.

Figure 4:
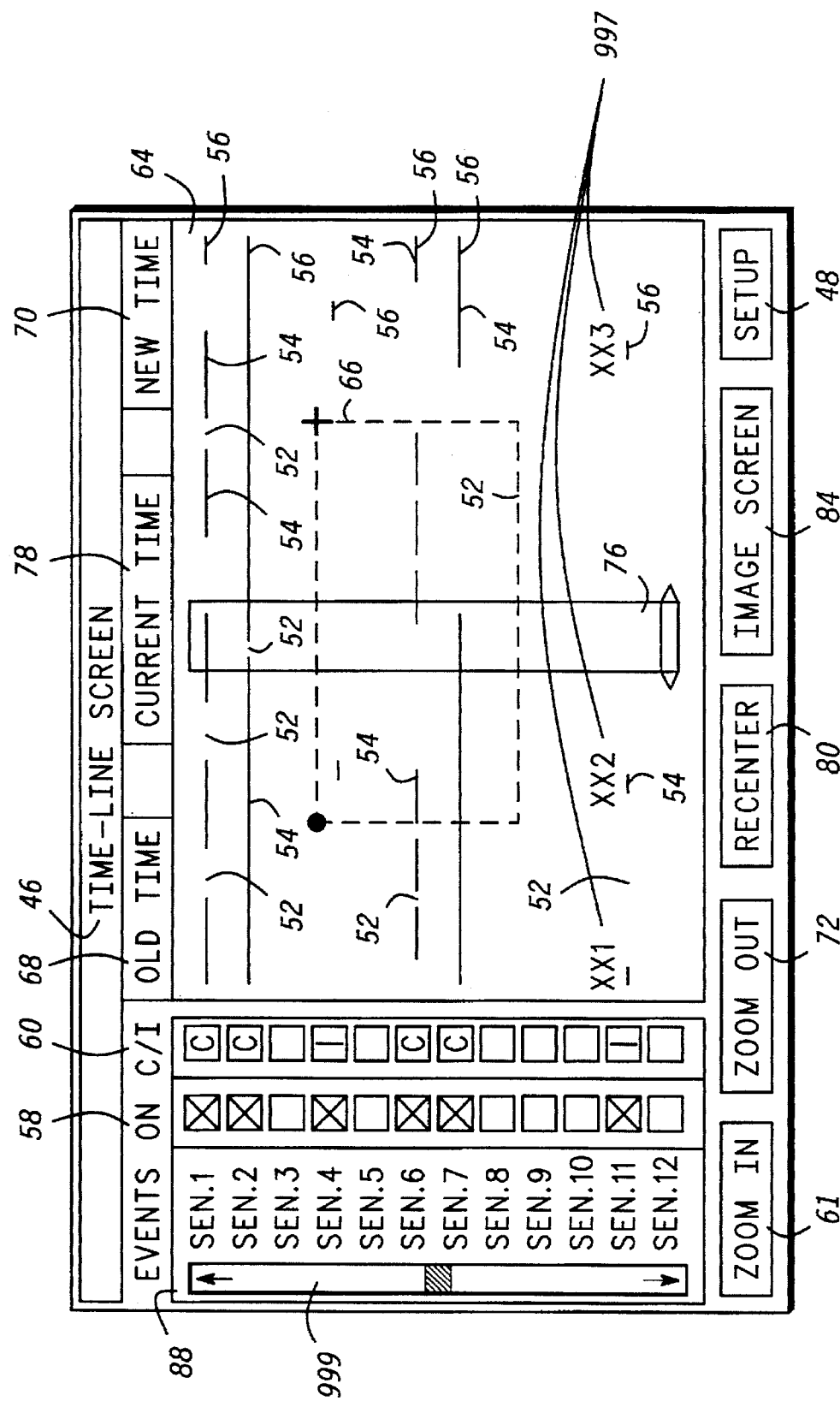
FIG. 4 shows a schematic view of an exemplary time-line screen generated by the system of FIG. 1.

FIG. 4 shows a schematic view of an exemplary time-line screen generated by draw process 34. The time-line window may be presented with the image window constructed by image process 24 (see FIG. 3) or in the time-line screen (see FIG. 4). These processes, screens, and windows are discussed further below. Those skilled in the art will appreciate that FIG. 4 depicts only an example and that the present invention is not limited to visual depictions resembling FIG. 4.

Referring back to FIG. 2, a period process 40 also evaluates the events stored in database 26. In database 26, type and identification (ID) parameters for each event or record uniquely identify the sensor 12 that generated the data stored in the record. Period process 40 evaluates time stamps stored with each sensor's data in database 26. In particular, period process 40 identifies any periodicity trends in the sensor data.

Periodicity is a characteristic of the data provided by many different types of sensors. Such sensors generate valid data for a dwell or active duration, then generate either invalid data or no data for an inactive duration. The dwell and inactive durations together define a period for a sensor. Periodic sensors include sensors which are polled for data on a regular schedule, interrupt or call-in on a regular schedule, or which perform scanning operations in accordance with a schedule. The periodicity need not be followed precisely. Period process 40 identifies a period and dwell for each sensor having data in database 26. However, periodic sensor data is no requirement of the present invention, and when no periodicity is found, a period may be set equal to zero.

The period and dwell parameters are stored in a sensor characterization list portion 42 of set-up table 28 in association with sensor IDs. As discussed below, the periodicity information is used by compress process 30 in constructing the compressed time-line table 32 that may be quickly analyzed to generate a time-line window.

A user interface process 44 is performed by system 10 to allow a user to adjust data stored in set-up table 28.

Figure 5:
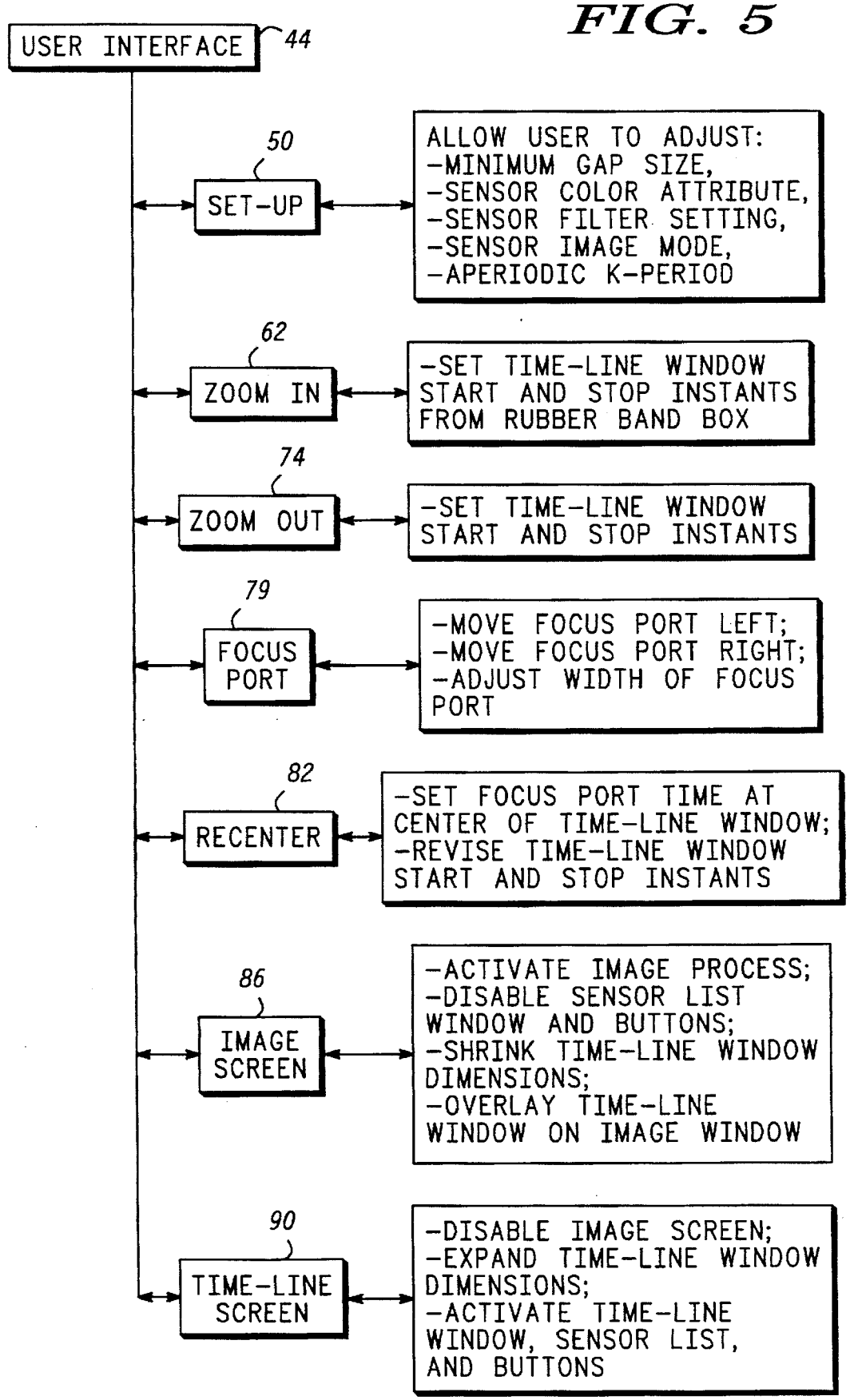
FIG. 5 shows a block diagram of a user interface process performed by the system of FIG. 1.

FIG. 5 shows a block diagram of user interface process 44. With reference to FIGS. 4 and 5, a time-line screen 46 may include a set-up button 48 which may be selected by a user to perform a set-up procedure 50. Procedure 50 incorporates conventional user data entry techniques to accept user input data which adjust a minimum gap size, as described below, sensor color attributes, sensor filter settings, sensor image modes, and/or an aperiodic parameter K.

The minimum gap size defines the smallest gap 52 that will be drawn or otherwise displayed between line segments 54 of a time line 56. Gaps 52 correspond to durations for which valid sensor 12 (see FIGS. 1 and 2) data are unavailable. If loss of data is less than gap time no stop/start line will be recorded or displayed. The minimum gap size may be defined by specifying a number of display pixels or time.

The color attribute associates a color with a sensor 12. In the preferred embodiments, a graphic object illustrated in the image screen (see FIG. 3), and a time line 56 constructed for a particular sensor 12 are displayed using a common color attribute specified by a user through procedure 50. Procedure 50 may export the color attribute to image process 24 (see FIG. 2) as a command to associate a particular color attribute with a particular sensor type and ID.

FIG. 4 shows a sensor label attribute 997. This textual label 997 will further enable visual correlation of events of normally low periodicity. This label 997 will be part of the sensor resource attributes and input data.

FIG. 4 illustrates the operation of a filter parameter through an "on" column 58. By selecting a box adjacent to an identified sensor, a filter setting may be toggled. A check mark may be placed in the box to indicate a selected sensor and omitted from a box to indicate a non-selected sensor. Time-lines 56 will optionally be displayed or not in 64 based on user interface set up 50. Raw image data as processed by 24 will not be displayed when 58 is "OFF" for a particular sensor. The filter data will be exported to image process 24 (see FIG. 2) so that image process 24 will know which sensor data to include and omit from the image screen (see FIG. 3).

FIG. 4 illustrates the operation of sensor image mode parameters through a "C/T" column 60. The letters "C" and "T" denote the compressed and integrated modes of operation, discussed above. Boxes aligned with sensor designators may toggle between "C" and "T" designations to define a display mode for each sensor. The image mode parameters will be exported to image process 24 (see FIG. 2) so that image process 24 will display sensor data in a desired mode.

The aperiodic parameter K specifies the number of periods for which sensor data must be absent in database 26 for system 10 to depict the unavailability of valid data as a gap 52 in a corresponding time line 56.

Time-line screen 46 may include a "zoom in" button 61 which a user selects to perform a zoom in procedure 62. In an alternate embodiment, procedure 62 may be activated by pressing a selected mouse button (not shown) associated with rubber band box 66. Procedure 62 incorporates conventional user data entry techniques to shorten a baseline display duration for a time-line window 64 displayed in the time-line screen 46 and in the image screen (see FIG. 3).

Procedure 62 may use a rubber band box 66 controlled by a pointing device to specify a desired display duration which is shorter than a baseline display duration. The baseline display duration corresponds to the amount of time depicted by time-line window 64. An old time parameter 68 specifies a start instant for the baseline time-line window 64 and a new time parameter 70 specifies a stop instant for the baseline time-line window 64. Left and right vertical sides of rubber band box 66 specify new start and stop instants, respectively. Procedure 62 modifies set-up table 28 (see FIG. 2) by overwriting baseline start and stop instants with the new start and stop instants.

Time-line screen 46 may include a zoom out button 72 which a user selects to perform a zoom out procedure 74. In an alternate embodiment, procedure 74 may be activated by pressing a selected mouse button (not shown). Procedure 74 incorporates conventional user data entry techniques to lengthen the baseline display duration for time-line window 64. Procedure 74 modifies set-up table 28 by overwriting baseline start and stop instants with the new start and stop instants that define a display duration longer than the baseline display duration.

The display time-line window 64 represents a view of the entire set of raw data in the raw displayable data base 26. When the window 64 old time 68 and the new time 70 represent the total data in the data base 26, the window is said to be zoomed out to a maximum extent. Utilizing rubber banding of area 66 or by zoom in button 61, the old time 68 and the new time 70 will show the subset of displayable event data for the compression or integration modes.

A focus port 76 represents a sub-region of event data that will be viewed in the compression mode as incremental newer or older frames of data are displayed in a single frame or sequentially automatically displayed frames are presented in display area 64.

Time-line window 64 desirably includes a graphic object designated as a focus port 76. Focus port 76 is defined through focus port start and stop instants specified in set-up table 28. Focus port 76 corresponds to a portion of the time-designated in time-line window 64. Desirably, focus port 76 perpendicularly traverses each time line 56. Focus port 76 identifies an imaged or current instant, which may be numerically specified in a current time block 78. This imaged instant represents the point in time for which the image screen (see FIG. 3) is valid. In the compression mode of display, the width of focus port 76 defines the duration which is integrated together for display on the image screen.

Item 998 is a compression mode sub-integration period. Item 64 is also a focus port. Item 999 is a slider bar for viewing other sensor beyond 12.

User interface process 44 may accept user input data directed to focus port 76 by having the user select the focus port using a pointing device. By selecting appropriate features of focus port 76, a procedure 79 allows the user to move or drag focus port 76 to the left in a direction parallel to time lines 56 to indicate an image instant earlier in time. The user may move or drag focus port 76 to the right in a direction parallel to time lines 56 to indicate an image instant later in time. In addition, the user may widen or narrow focus port 76 to change the duration for which images may be integrated together in the image screen for the compression mode (see FIG. 3). The focus port 76 start and stop instants will be exported to image process 24 (see FIG. 2) to control the presentation of the image screen.

Time-line screen 46 may include a recenter button 80 which a user selects to perform a recentering procedure 82. In an alternate embodiment, procedure 82 may be activated by pressing a selected mouse button (not shown). Procedure 82 adjusts the start and stop instants for time-line window 64 so that the current instant defined by focus port 76 is centrally positioned between these start and stop instants. Thus, a revised display duration is determined in response to a focus port position.

Time-line screen 46 may also include an image screen button 84 which a user selects to perform an image screen procedure 86. Procedure 86 activates image process 24 (see FIG. 2) so that the image screen (see FIG. 3) is displayed. Then, procedure 86 disables a sensor list portion 88 of time-line screen 46 and shrinks the X-Y dimensions of time-line window 64. The shrunken time-line window 64 is then overlaid upon a portion of the image generated by image process 24, as illustrated in FIG. 3.

When the image screen is active, the user may use a pointing device to select the shrunken time-line window 64 overlaid therein to invoke a time-line screen procedure 90. Procedure 90 disables the image screen, expands the X-Y dimensions of time-line window 64, then activates sensor list 88, the expanded time-line window 64, and buttons of time-line screen 46. Time-line screen 46 is displayed as a result.

Those skilled in the art will appreciate that user interface 44 may include additional procedures for obtaining data from a user to further control the operation of display 16 (see FIGS. 1 and 2).

Figure 6:
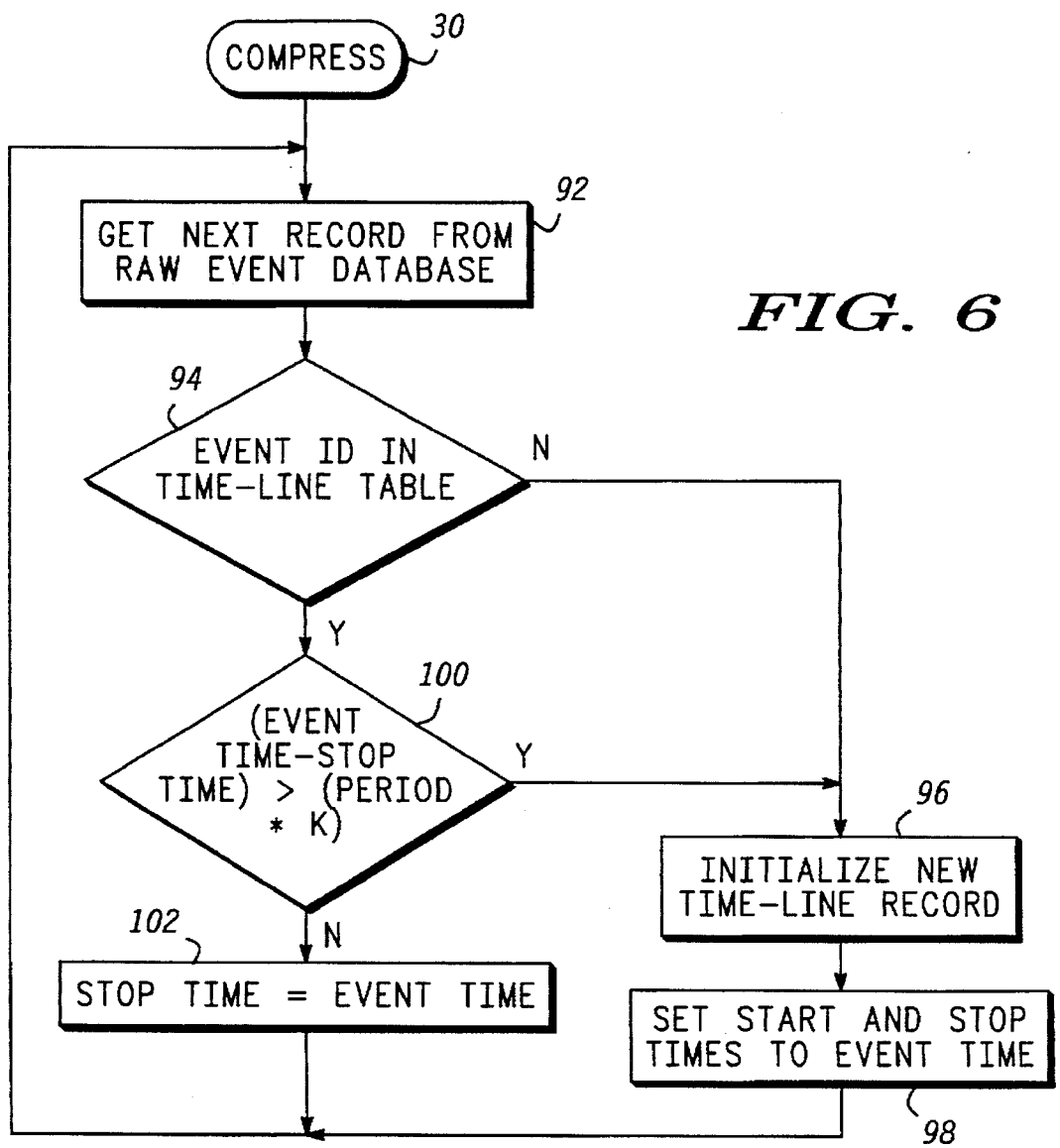
FIG. 6 shows a flow chart of a compress process.

FIG. 6 shows a flow chart of compress process 30. Process 30 includes a task 92 in which sensor data are obtained. In particular, task 92 gets an event record from raw displayable event database 26 (see FIG. 2). Process 30 operates in a programming loop which repetitively evaluates all records from database 26 one at a time or may be event driven by new data arrival from image process 24. Accordingly, task 92 gets either the first record in database 26 or a record immediately following the previously evaluated record. Desirably, records are stored chronologically in database 26 so that earlier records are evaluated prior to later records. Each record includes data identifying a particular sensor, such as a type and ID designation, a time stamp, and additional data which are used by image process 24 (see FIG. 2).

Next, a query task 94 determines whether the event record ID already exists in compressed time line table 32 (see FIG. 2). If compressed time-line table 32 does not already include a time-line record for the sensor ID, then a task 96 initializes a new time-line record in table 32 for the sensor. The time-line record needs to include only the sensor ID, a start time and a stop time. Desirably, time-line records are organized in a structured list where records for common sensors are grouped together, and within common sensor groups records are desirably grouped chronologically. After task 96, a task 98 sets both the start and stop times in the newly initialized record to the event time indicated in the currently evaluated event record from raw displayable event database 26 (see FIG. 2). After task 98, program control loops back to task 92 to evaluate the next event record from database 26 or to await the next interrupt.

When task 94 determines that an event record from database 26 is from a sensor already described in compressed time-line table 32 (see FIG. 2), a query task 100 is performed. Task 100 evaluates whether an aperiodic occurrence has taken place. In particular, task 100 evaluates the sensor's last time-line record in table 32. If the event time described by the event record from database 26 minus the stop time for this time-line record in table 32 is greater than the sensor's period times the aperiodic constant K, then an aperiodic occurrence has taken place. In other words, if the duration for which this sensor's data has been unavailable exceeds K sensor periods, then an aperiodic occurrence has taken place.

Task 100 has knowledge of the sensor's period and of the aperiodic constant K by evaluating set-up table 28. While K may take any value, values less than three are typical. When an aperiodic event is detected, program control proceeds to task 96 to initialize a new time-line record for the sensor in table 32. The stop time for the previous time-line record will indicate the last instant when sensor data were available. The start time for the newly initialized time-line record will indicate the instant when sensor data becomes available again.

When task 100 fails to detect an aperiodic occurrence in the sensor data, a task 102 overwrites the stop time of the sensor's time-line record with the event time from the event record obtained from database 26. Accordingly, so long as sensor data from database 26 remains generally available within the definition of any periodicity associated with the sensor, time-line table 32 extends the time-line stop instant to indicate continued availability of data. After task 102, program control loops back to task 92 to evaluate the next record from database 26. Compress process 30 continues to evaluate event records within database 26 until all event records have been evaluated for the purpose of constructing time-line records.

Figure 7:
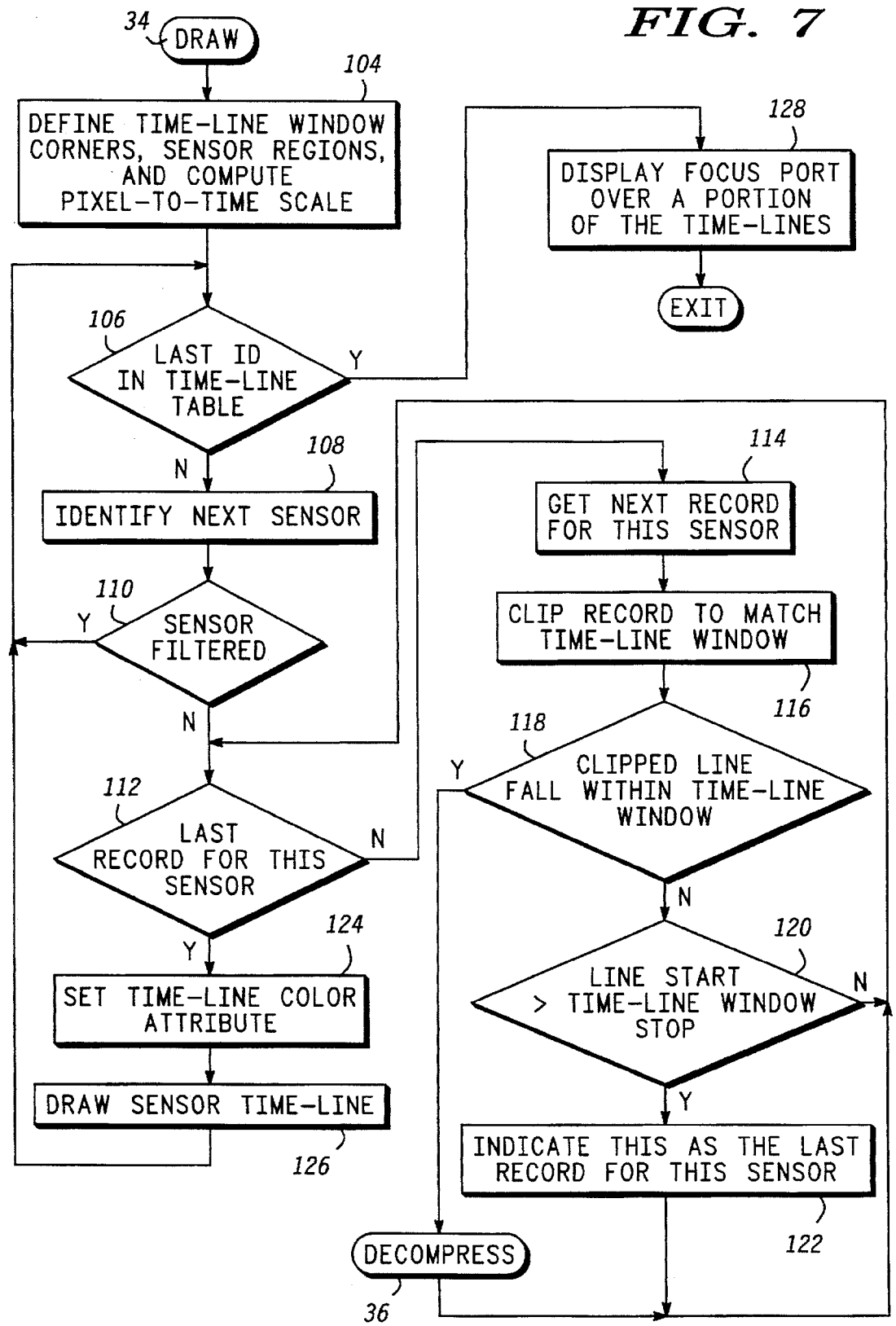
FIG. 7 shows a flow chart of a draw process.

FIG. 7 shows a flow chart of draw process 34. Generally, draw process 34 evaluates the time-line records included in time-line table 32 (see FIG. 2) to draw time-line window 64 (see FIGS. 3 and 4). Process 34 includes a task 104 to define the current time-line window's corners and sensor regions of display, and to compute a pixel-to-time scale. The time-line window corners define the placement and size of time-line window 64. As discussed above, time-line window 64 may be displayed in an expanded size in time-line screen 46 (see FIG. 4) or in a shrunken size in the image screen 64 (see FIG. 3). These parameters may be temporarily stored in set-up table 28 (see FIG. 2) or other variables.

The sensor regions defined in task 104 represent roughly equal length, horizontal, parallel strip regions of time-line window 64. Eventually, process 34 may draw a time line 56 which is formed from line segments 54 separated by gaps 52 (see FIG. 4) in any one or more of these strip regions. Each sensor region corresponds to one sensor. The length of each sensor region corresponds to the display duration characterized by time-line window 64. As discussed above, the display duration is defined by start and stop instants saved in set-up table 28 and may be changed through user interface process 44. The strip regions are defined by a vertical coordinate chosen in response to a sensor ID. The start and stop instants for time-line window 64 correspond to horizontal coordinates for the strip region. The strip regions may be defined through vertical position coordinates saved in sensor list 42 of set-up table 28 (see FIG. 2) in association with sensor IDs.

Window 64 can be a vertically scrolled list 999 to allow for a large number of sensors or sub-sensors, typically six, but may be over on hundred, if sub-sensor categories are programmed.

The pixel-to-time scale defined in task 104 corresponds to the horizontal size defined for time-line window 64. The number of display 16 (see FIGS. 1 and 2) pixels residing in a horizontal direction between the currently defined left and right sides of time-line window 64 is divided by the amount of time transpiring between the start and stop instants currently defined for time-line window 64.

After task 104, process 34 operates within a programming structure that includes inner and outer nested programming flow loops. The outer loop is traversed once for each sensor 12. The inner loop is traversed once for each time-line record from compressed time-line table 32. After task 104, a query task 106 tests for the end of the outer loop by determining whether the last sensor ID from time-line table 32 has been evaluated. So long as the last sensor described in table 32 has not yet been evaluated, a task 108 identifies another sensor to evaluate.

After task 108, a query task 110 determines whether the identified sensor is filtered. User input data related to "on" column 58 of time-line screen 46 (see FIG. 4) defines the filtered status, and task 110 may make its determination by evaluating sensor characterization list 42 of set-up table 28 (see FIG. 2). If the identified sensor 12 is filtered, program control loops back to task 106 to test whether that sensor 12 was the last sensor in table 32. Process 34 will refrain from drawing a sensor time line 56 (see FIG. 4) corresponding to the filtered sensor 12.

When task 110 determines that the current sensor 12 is not filtered, process 34 enters the above-discussed inner loop which evaluates time-line records for the identified sensor 12 from compressed time-line table 32 (see FIG. 2) one at a time. A query task 112 determines whether a last-evaluated time-line record from table 32 is the last record for the current sensor 12. So long as this time-line record is not the last record, a task 114 gets the next time-line record from table 32 for this sensor 12. Of course, when no previous time-line record has been evaluated task 112 will route program control to task 114, which will get the first time-line record for the current sensor.

After task 114, a task 116 performs a conventional line clipping operation to cause the record's start and stop times to reside only within time-line window 64, if possible. In other words, task 116 adjusts the time-line record's start time to be no sooner than the start instant for time-line window 64 and adjusts the time-line record's stop time to be no later than the stop instant for time line window 64, if possible.

After task 116, a query task 118 determines whether the clipped line falls within time-line window 64. If the time-line record's start time was later than the window's stop instant or the time-line record's stop time was earlier than the window's start instant, then the clipped line will not fall within time-line window 64 and process 34 will perform a query task 120.

Task 120 determines whether the time-line record start time was later than the time-line window stop instant. In this situation, process 34 need not consider other time-line records for the current sensor 12 because they will also fall outside time-line window 64 due to the chronological organization of table 32. A task 122 sets a variable to indicate the last record for the current sensor, and program control loops back to task 112, where program flow will exit the inner loop. When task 120 determines that the time-line record start time is not greater than the time-line window stop instant, program control loops back to task 112 to determine whether the just-evaluated time-line record was the last record for the current sensor in table 32.

Referring back to query task 118, when task 118 determines that the clipped time-line falls within time-line window 64, program flow proceeds to decompress process 36. Generally speaking, process 36 places X-Y coordinates of one or more line segments 54 (see FIG. 4) in display list 38 (see FIG. 2). The number of line segments 54 and their placement is determined in response to the clipped time-line record evaluated at task 118. Process 36 is discussed in more detail below in connection with FIG. 8. When program control returns from process 36, the subject time-line record from table 32 has been translated into one or more coordinate sets for line segments 54. At this point, program control returns to task 112 to determine whether the subject time-line record was the last record for the current sensor 12.

When task 112 encounters the last time-line record for a sensor 12, a task 124 sets or otherwise assigns a color attribute for a time-line 56. The color attribute may be obtained from sensor list 42 of set-up table 28. After task 124, a task 126 draws the sensor time-line 56 (see FIG. 4) using the color attribute set above in task 124 and line segment definitions from display list 38 (see FIG. 2). In the preferred embodiment, the time-line 56 for each sensor 12 is drawn using the same color that image process 24 (see FIG. 2) uses to present sensor data in the image screen (see FIG. 3). This color coordination permits easy recognition between sensor data and corresponding time lines 56.

After task 126, program control loops back to task 106 to determine whether the just-evaluated sensor 12 was the last sensor 12 characterized in compressed time-line table 32. When task 106 detects the last sensor 12, a task 128 displays focus port 64 (see FIG. 4) over a portion of time-line window 64. The horizontal definition for focus port 76 may be obtained from set-up table 28 (see FIG. 2), and this definition may be adjusted through the acceptance of user input data in user interface process 44 (see FIG. 5). Desirably, vertical coordinates for focus port 76 are chosen so that focus port 76 perpendicularly traverses the strip regions and corresponding time lines 56 (see FIG. 4). Thus, the intersection of focus port 76 with time lines 56 defines instants in time for each sensor 12. After task 128, program control exits draw process 34. However, process 34 may be repeated as needed to update time-line window 64.

Figure 8:
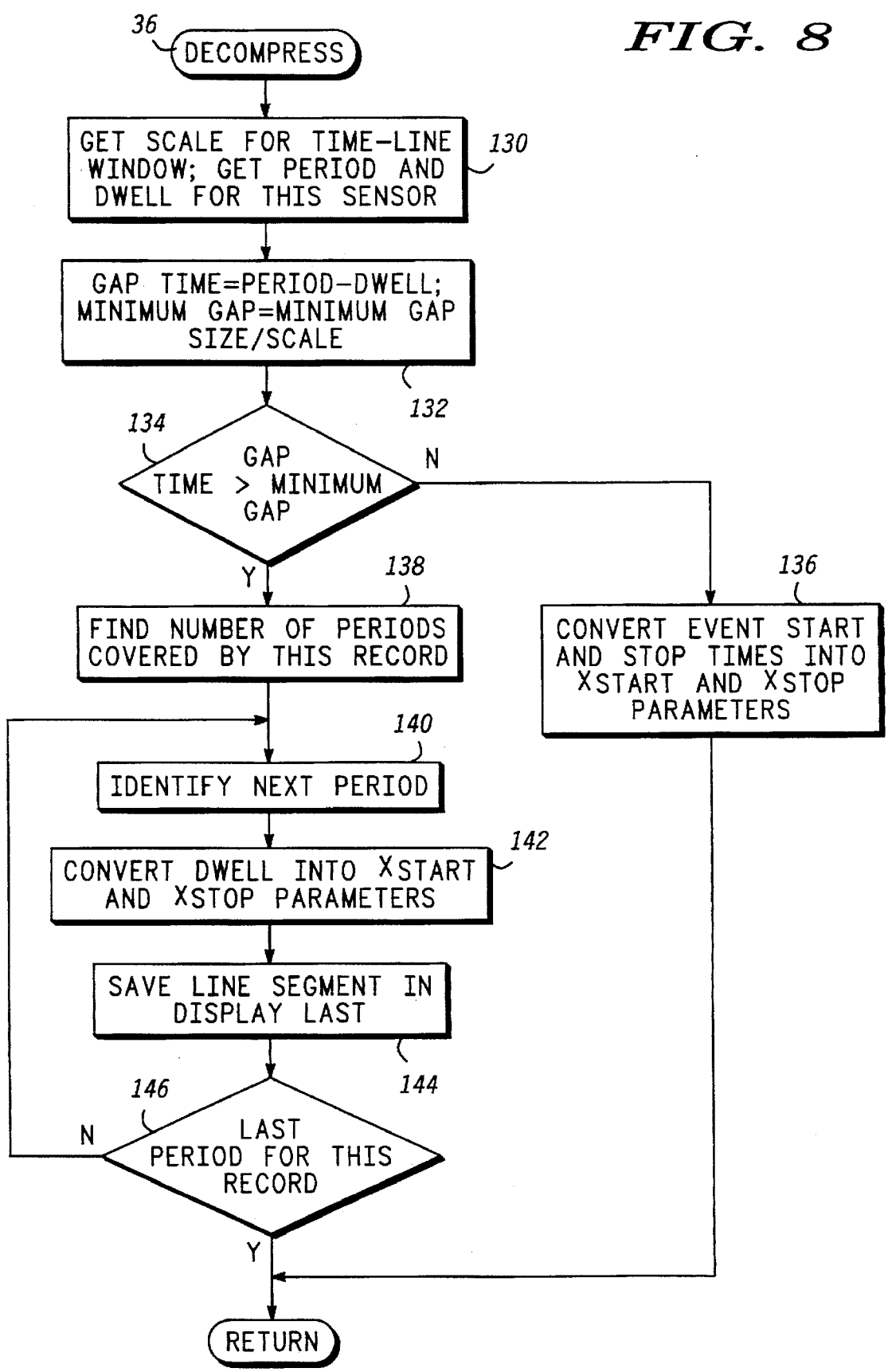
FIG. 8 shows a flow chart of a decompress process.

FIG. 8 shows a flow chart of decompress process 36. As discussed above, decompress process 36 is called to translate a clipped time-line record from compressed time-line table 32 (see FIG. 2) into coordinates for one or more line segments 54 (see FIG. 4). These coordinates are stored in display list 38 (see FIG. 2).

Process 36 includes a task 130 which gets the current pixel-to-time scale for time-line window 64. Task 130 also gets the period and dwell parameters for the current sensor 12. The scale, period, and dwell parameters may be obtained from set-up table 28 (see FIG. 2).

Next, a task 132 calculates a gap time and a minimum gap. The gap time for the current sensor 12 equals the sensor's period minus the sensor's dwell. In other words, it equals the duration for which a periodic sensor is typically inactive, generates no data, or generates only invalid data. The minimum gap is set equal to the minimum gap size, discussed above in connection with procedure 50 (see FIG. 5) divided by the current pixel-to-time scale. This causes the minimum gap to be expressed in units of time, and it represents the smallest duration of unavailable sensor data which will be depicted as a gap 52 in time-line window 64 (see FIG. 4).

After task 132, a query task 134 determines whether the gap time for the sensor identified in the current time-line record is greater than the currently defined minimum gap. If the sensor's gap time is less than the minimum gap, then the current time-line record need not be decompressed. A task 136 converts the event start and stop times, which may have been adjusted in task 116 (see FIG. 7), into $X_{start}$ and $X_{stop}$ parameters for a line segment 54 (see FIG. 4). These parameters define the ends of a horizontal line to be drawn by process 34 (see FIG. 7). The vertical placement of this horizontal line may be determined from the vertical position parameter in sensor list 42 of set-up table 28 for the current sensor. Task 136 uses the scale factor and time-line window coordinates in its conversion.

Accordingly, a single time-line record from compressed time-line table 32 is translated into a single line segment 54. Other line segments for the time-line 56 of which this line segment 54 is a part may or may not have been defined through other time-line records. If such other line segments exist, they will be positioned collinearly with the just-defined line segment because an association with a common sensor 12 will cause them to have a common vertical position parameter. Program control returns to draw process 34 (see FIG. 7) after task 136.

When a sensor 12 provides non-repeating data, the start and stop times may be the same. In this situation, task 136 may expand start and stop times so that a minimum length line segment 54 is defined.

When task 134 determines that the current sensor's gap or inactive time is greater than the minimum gap defined for time-line window 64, the time-line record needs to be decompressed to define several line segments 54 from the single time-line record. A task 138 finds the number of sensor periods covered between the time-line record's start and stop times. Next, a programming loop evaluates these periods one at a time.

In particular, a task 140 identifies the start of a next period. A task 142 converts this start time and the sensor's dwell duration into $X_{start}$ and $X_{stop}$ line segment parameters. Task 142 uses the scale factor and time-line window coordinates in this conversion. These parameters and a vertical position parameter are saved in display list 38 (see FIG. 2) at a task 144.

After task 144, a query task 146 determines whether the just-evaluated period is the last period defined for the current time-line record. So long as additional periods remain, program control loops back to task 140 to define line segment coordinates for a line segment 54 (see FIG. 4) that will characterize the dwell duration of another period. Line segments for the other periods will be positioned collinearly with the just-defined line segment because an association with a common sensor 12 causes them to have a common vertical position parameter. When task 146 detects the last period for the current time-line record, program control returns to draw process 34 (see FIG. 7).

In summary, the present invention provides an improved method and apparatus for visually correlating temporal relationships. The preferred embodiments of the present invention graphically display multi-dimensional, discontinuous and asynchronous data. The graphical display presents temporal relationships between discontinuous data collected from a plurality of diverse sensors.

The present invention has been described above with reference to preferred embodiments. However, those skilled in the art will recognize that changes and modifications may be made in these preferred embodiments without departing from the scope of the present invention. For example, the precise tasks, task sequencing, and allocation of tasks to processes may be changed from that described herein. Moreover, the precise depictions and orientations of display presentations are included herein for the purpose of example only. Those skilled in the art will appreciate that equivalent results may be obtained using vastly differing imagery. These and other changes and modifications which are obvious to those skilled in the art are intended to be included within the scope of the present invention.

What is claimed is:

1. A method for visually correlating temporal relationships between a plurality of discontinuous sensor data sets, said method comprising the steps of:

obtaining sensor data from a plurality of sensors throughout a display duration, said sensor data being characterized by periods for which valid sensor data are unavailable, said sensor data further describing multi-dimensions of a particular temporal relationship;

defining a plurality of approximately equal length strip regions of a display window so that each of said plurality of approximately equal length strip regions corresponds to one of said plurality of sensors and so that a length of each of said plurality of approximately equal length strip regions corresponds to said display duration; and for each of said plurality of approximately equal length strip regions, drawing a sensor time line therein, said sensor time line comprising one or more collinear line segments separated by gaps, said gaps being dimensioned to correspond to said periods for which said valid sensor data are unavailable.

2. A method as claimed in claim 1 wherein:

said method additionally comprises the step of obtaining, user input data defining a minimum gap size; and the step of drawing comprises the step of depicting durations for which said valid sensor data are unavailable for less than said minimum gap size with said collinear line segments.

3. A method as claimed in claim 2 wherein said defining and drawing steps are directed to a first window of said display duration, and said method additionally comprises the steps of:

presenting said sensor data in a second window on said display duration; and overlaying said first window on a portion of said second window.

4. A method as claimed in claim 3 additionally comprising the step of displaying a focus port in said first window, said focus port identifying a portion of said display duration.

5. A method as claimed in claim 4 wherein said display duration begins at a start instant and ends at a stop instant, and said method additionally comprises the steps of:

accepting recentering user input data;

identifying a current instant in response to said accepting step and in response to a current position for said focus port;

identifying a revised display duration having a revised start instant and a revised stop instant determined in response said current instant; and repeating said defining and drawing steps for said revised display duration.

6. A method as claimed in claim 4 wherein said focus port resides at a current position, and said method additionally comprises the steps of:

accepting focus-port-movement user input data; and moving said focus port from said current position substantially parallel to said plurality of roughly equal length strip regions in response to said user input data.

7. A method as claimed in claim 4 wherein said presenting step presents sensor data obtained during said portion of said display duration identified by said focus port.

8. A method as claimed in claim 7 additionally comprising the steps of:

accepting focus-port-persistence user input data;

adjusting said portion of said display duration identified by said focus port in response to said focus-port-persistence user input data to produce an adjusted portion of said display duration; and repeating said presenting step so that an image presented in said second window reflects sensor data obtained during said adjusted portion of said display duration.

9. A method as claimed in claim 4 wherein:

said defining step comprises the step of orienting said plurality of roughly equal length strip regions to be substantially parallel to one another; and said displaying step comprises the step of substantially configuring said focus port to perpendicularly traverse each of said plurality of roughly equal length strip regions.

10. A method as claimed in claim 1 wherein:

said sensor data are periodic with substantially regular active and inactive durations; and said method additionally comprises the step of detecting aperiodic occurrences in said sensor data.

11. A method as claimed in claim 10 wherein said method additionally comprises the step of compressing said sensor data to reduce re-display time processing.

12. A method as claimed in claim 10 wherein said method additionally comprises the step of decompressing said compressed sensor data.

13. A method as claimed in claim 1 additionally comprising the steps of:
obtaining sensor data from an auxiliary sensor not included in said plurality of sensors;
accepting filtering user input data which identifies said auxiliary sensor; and
refraining, in the step of drawing, from drawing a sensor time line corresponding to said auxiliary sensor.

14. A method as claimed in claim 1 wherein said display duration is a baseline duration, and said method additionally comprises the steps of:
accepting user input data defining a revised display duration which is shorter than said baseline duration; and
repeating said defining and drawing steps to correspond to said revised display duration.

15. A method as claimed in claim 14 wherein said presenting step comprises the steps of:
assigning a different label attribute to said sensor data obtained from said selected sensors;
displaying a plurality of labels uniquely associated with each new event associated with one particular sensor in said second window; and
displaying a corresponding one of a plurality of sensor event labels in said first window.

16. A method as claimed in claim 14 wherein:
said presenting step comprises the step of assigning different color attributes to data obtained from different sensors; and
the step of drawing comprises the step of assigning said different color attributes to said sensor time line so that, for each sensor, a common color is used to display sensor data in said second window and to display a corresponding one of a plurality of sensor time lines in said first window.

17. A method as claimed in claim 1 wherein said display duration is a baseline duration, and said method additionally comprises the steps of:
accepting user input data defining a revised display duration which is longer than said baseline duration; and
repeating said defining and drawing steps to correspond to said revised display duration.

18. A method for visually correlating temporal relationships between multi-dimension data collected by a sensor, said method comprising the steps of:
displaying in a first window, a time line comprising at least two collinear line segments separated by one or more gaps, said one or more gaps being dimensioned to correspond to periods for which valid data are unavailable from said sensor;
overlaying a focus port on a portion of said time line so that an imaged instant is defined by an intersection between said focus port and said time line; and
displaying in a second window, a multi-dimensional image configured in response to data provided by said sensor during said imaged instant.

19. A method as claimed in claim 18 additionally comprising the step of overlaying said first window over a portion of said second window.

20. A method as claimed in claim 18 wherein the time line begins at a start instant and ends at a stop instant, and said method additionally comprises the steps of:

accepting recentering user input data;
identifying a revised start instant and a revised stop instant determined in response to said imaged instant; and
revising said time line to reflect said revised start and stop instants.

21. A method as claimed in claim 18 additionally comprising the steps of:
accepting focus-port-movement user input data; and
moving said focus port from said imaged instant substantially parallel to said time line in response to said focus-port-movement user input data.

22. A method as claimed in claim 18 wherein:
said multi-dimension data are collected by a plurality of sensors;
said displaying in a first window step displays a plurality of time lines corresponding to said multi-dimension data collected from said plurality of sensors; and
said displaying in a second window step displays a plurality of multi-dimensional images wherein plurality of said multi-dimensional images correspond to said multi-dimension data collected from said plurality of sensors during said imaged instant.

23. A method as claimed in claim 22 wherein:
said displaying in a first window step comprises the step of assigning different color attributes to different time lines; and
said displaying in a second window step comprises the step of assigning said different color attributes to said plurality of multi-dimensional images so that, for each sensor, a common color is used to display sensor data in said second window and to display a corresponding one of said different time lines in said first window.

24. An apparatus for visually correlating temporal relationships between a plurality of discontinuous sensor data sets comprising:
a plurality of sensors for providing sensor data throughout a display duration, said sensor data being characterized by periods for which valid sensor data are unavailable, said sensor data further describing multi-dimensions of a particular temporal relationship;
a controller coupled to said plurality of sensors and configured to define a plurality of approximately equal length strip regions of a display window so that each approximately equal length strip region corresponds to one of said plurality of sensors and so that a length of each approximately equal length strip region corresponds to said display duration; and
a display coupled to said controller configured to depict a plurality of sensor time lines therein, said plurality of sensor time lines comprising one or more collinear line segments separated by gaps, said gaps being dimensioned to correspond to said periods for which said valid sensor data are unavailable.

25. An apparatus as claimed in claim 24 wherein said controller and display are configured in cooperation with one another so that said plurality of sensor time lines are displayed in a first window of said display, said sensor data are presented in a second window of said display, and said first window is overlaid on a portion of said second window.

* * * * *